United States Patent [19]

Ankenbauer et al.

[11] Patent Number: 4,944,611
[45] Date of Patent: Jul. 31, 1990

[54] DIE CAST ANTI-FRICTION BEARING HOUSING

[75] Inventors: Gerhard Ankenbauer, Rotenburg/Fulda; Heinrich Hofmann, Schweinfurt, both of Fed. Rep. of Germany

[73] Assignee: FAG Kugelfischer Georg Schafer (KGaA), Fed. Rep. of Germany

[21] Appl. No.: 354,450

[22] Filed: May 19, 1989

[30] Foreign Application Priority Data

Mar. 3, 1989 [DE] Fed. Rep. of Germany ....... 3906801

[51] Int. Cl.[5] .......................................... F16C 35/077
[52] U.S. Cl. .................................... 384/476; 384/537; 384/569
[58] Field of Search ............... 384/476, 537, 512, 569, 384/486, 484

[56] References Cited

U.S. PATENT DOCUMENTS 4,701,061 10/1987 Stubbersfield ...................... 384/569
4,746,231 5/1988 Hoshino ............................... 384/539
4,854,751 8/1989 Grassmuck et al. ................. 384/476

Primary Examiner—Lenard A. Footland
Attorney, Agent, or Firm—Ostrolenk, Faber, Gerb & Soffen

[57] ABSTRACT

A sealed anti-friction bearing comprising a bearing surrounded by a die cast housing. The bearing includes a shaft having two axially spaced inner races defined in it, an outer ring around and radially spaced from the inner ring with respective races defined in it, and rolling elements between the races. A respective seal axially outward of each of the rows of rolling elements defines an enclosed sealed space between the seals. A housing is die cast around the outer ring. For providing heat protection during casting of the housing around the outer ring, a respective sheet metal jacket is placed around the outer ring in the axial regions covering the respective set of races and the adjacent seal, wherein the jacket is around the bearing during die casting of the housing thereon.

10 Claims, 2 Drawing Sheets

DIE CAST ANTI-FRICTION BEARING HOUSING

BACKGROUND OF THE INVENTION

The present invention relates to a cast housing for a sealed bearing and particularly to means between the bearing and the housing for temperature protection.

Federal Republic of Germany Pat. No. 3,333,506 discloses a method of manufacturing a housing with a built-in anti-friction bearing in which a completely assembled, greased and sealed anti-friction bearing is inserted into a die casting mold, the die casting mold is closed, liquid non-ferrous metal which has been heated to about 750° C. is poured into the die-casting mold under pressure, the mold is then opened after at most 15 seconds, and the housing with the included anti-friction bearing is ejected from the mold and immediately cooled.

This known method has proven its worth in practice. It is used, for instance, in automobile water pumps. For certain uses, however, special sealing materials, lubricating grease compositions or anti-friction bearings with specially heat treated rings are necessary because the heating occurred upon the pouring in of the liquid die casting material having, for example, a temperature of 750° C., can lead to damage. For instance, the seals can be overheated, the consistency of the lubricating grease can be changed, or the hardness of the bearing race can be reduced. Even with expensive cooling devices located within the die casting molds, damage cannot always be excluded in the case of such special applications.

SUMMARY OF THE INVENTION

It is the object of the present invention to develop an anti-friction bearing having a die cast housing of the aforementioned type which avoids the above disadvantages and a need for expensive cooling devices in the die casting mold.

This object is achieved with the invention which comprises before die casting the housing, surrounding the anti friction bearing in the axial regions of the bearing races and the bearing seals with a sheet metal jacket or a sheet metal cap which is cast in place around and together with the anti-friction bearing as the housing is die cast.

In housings according the invention, the disadvantageous changes experienced with prior art bearings no longer occur. The heat which is produced during casting in the mold is prevented by the sheet metal housing from rapidly passing radially inward to the regions of the races so that there are no heat caused injurious effects on the races, the grease or the seals. In addition, inexpensive seal attachment can be obtained and a light weight housing which still has required strength properties is obtained.

Other objects and features of the invention are explained below with reference to an illustrative embodiment shown in the drawings.

DESCRIPTION OF THE PREFERRED EMBODIMENTS

Figure 1:
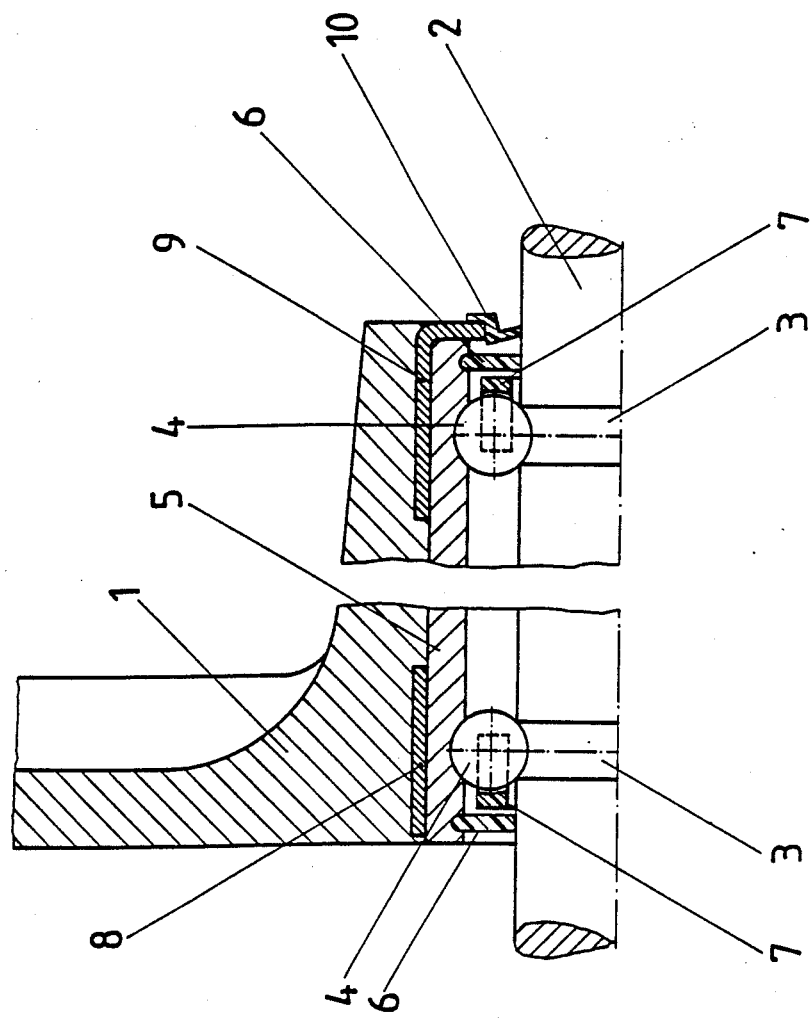
FIG. 1 is a partial cross-section through a die cast housing and bearing in accordance with the invention.

An anti-friction bearing is arranged within a die cast housing 1. The bearing is comprised of a shaft 2 with axially spaced apart rolling element races 3 worked into the shaft for receiving a respective row of rolling elements which are in the form of balls 4. An outer ring 5 having races 11 worked into it at axial locations corresponding to the races 3, surrounds the rolling elements 4. The balls 4 in each set of races are held apart by respective cages or separators 7.

Seals 6 are in the space between the outer ring 6 and the shaft 2 and there is a respective axially outward of each row of balls 4 for defining a sealed grease lubricated bearing. The seals are axially near the respective rows of balls making it easier to provide axial positioning of the race and seal protectors.

At the left in the drawing, a sheet metal, cylindrical jacket 8 is wrapped around the outer ring 5 in the axial region of the races 3 and 11 at the left and the adjacent seal 6. The jacket 8 prevents rapid transfer of heat during the die casting of the housing 1 to protect the bearing, the adjacent seal and the lubricating grease from temperature caused injury.

At the right in the drawing, a sheet metal, jacket in the form of a cylindrical cap 9 is disposed around the outer ring 2 in the axial region of the respective races 3 and 11 at the right and the adjacent seal 6. The cap 9 includes an axial end portion that wraps around the axial end of the ring 5. A further seal 10 is integrated on the axial end portion of the cap 9 and defines a further seal of the bearing axially outward of the primary seal 6.

Figure 2:
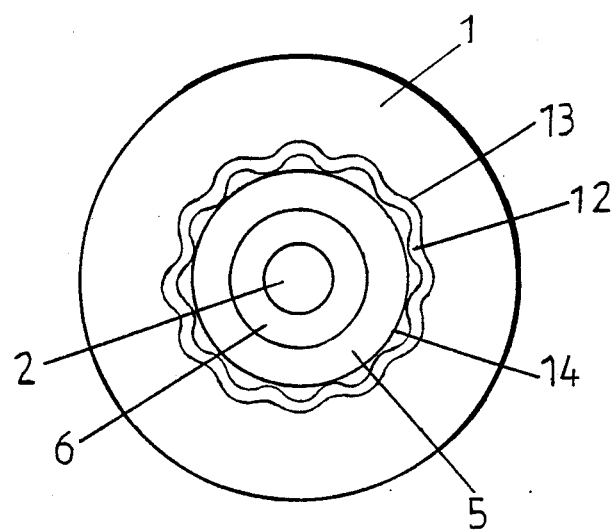
FIG. 2 is a cross section or end view showing an alternate embodiment of the invention.

The sheet metal jacket 8 and/or the sheet metal cap 9 can be corrugated across their entire radial thickness, as seen in jacket 12 FIG. 2. This provides for better heat conduction away from the outer ring. Alternately, one surface 13 or both surfaces of each of the jacket 8 and the cap 9, and/or the outer surface 14 if the outer ring 5 can be surface treated, for instance, each can be phosphated or ceramic coated, for heat insulation.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In combination, a cast bearing housing and an anti-friction bearing housed within the housing, the combination comprising:

the bearing comprising means defining an inner race for a row of bearing rolling elements; an outer ring around the inner race, the outer ring having an outer race defined in it which is placed axially for defining cooperating inner and outer races for rolling elements; a row of rolling elements received in the inner and outer races for rolling therealong; and seals for the anti-friction bearing between the means defining the inner race and the outer ring and located axially to the side of the row of rolling elements for defining a sealed space including the races and the row of rolling elements;

the housing comprising a cast housing cast around the outer ring;

a jacket wrapped about the outer ring in the axial region of the races and of the seal, the jacket being disposed inside the cast housing and separating the outer ring from the cast housing for the protection of the races and the seal during casting of the housing.

2. The combination of claim 1 wherein the jacket is comprised of sheet metal.

3. The combination of claim 2, wherein the outer ring of the bearing has a surface which is treated in the axial region of the respective set of races with the heat resistance coating.

4. The combination of claim 2, wherein the jacket has a heat resistant coating defined on a surface thereof in the axial region of the respective race.

5. The combination of claim 2, wherein at least one of the metal jackets is corrugated.

6. The combination of claim 1, wherein the means defining the inner race comprises means for defining two of the inner races axially spaced apart; the outer ring having two respective outer races, each placed axially for cooperating with the respective inner race for defining a respective set of an inner and outer race; and a respective row of rolling elements in each of the first set and the second set of inner and outer races;

a first of the seals being defined axially outward of one of the sets of races and a second of the seals being defined axially outward of the other of the sets of races, such that a sealed space is defined between the first and the second seals;

one of the jackets being wrapped around the outer ring at the first set of races and the respective first seal and another of the jackets being wrapped around the outer ring at the second set of races and the respective second seal.

7. The combination of claim 3, wherein the means defining the inner races comprises a shaft having the inner races defined in the shaft.

8. The combination of claim 6, wherein the first seal is near enough to the first set of races that the first jacket extends axially past the first set of races and the first seal; and the second seal is near enough to the first set of races that the second jacket extends axially past the second set of races and the second seal.

9. The combination of claim 8, wherein one of the jackets includes an end cap which wraps around its respective axial end of the outer ring.

10. The combination of claim 9, further comprising an additional seal attached to the end cap and extending from the end cap to the means defining the inner races, and the additional seal being located axially outward of the respective seal at the respective set of the races.

* * * * *